United States Patent [19]

Newhouse et al.

[11] Patent Number: 4,877,300
[45] Date of Patent: Oct. 31, 1989

[54] NON-ADIABATICALLY-TAPERED CONNECTOR

[75] Inventors: Mark A. Newhouse; Daniel A. Nolan; David L. Weidman, all of Corning, N.Y.

[73] Assignee: Corning Incorporated, Corning, N.Y.

[21] Appl. No.: 261,270

[22] Filed: Oct. 24, 1988

[51] Int. Cl.$^4$ .................................................. G02B 6/26
[52] U.S. Cl. ............................... 350/96.15; 350/96.21; 350/96.33
[58] Field of Search ................ 350/96.15, 96.18, 96.20, 350/96.21, 96.29, 96.30, 96.33

[56] References Cited

U.S. PATENT DOCUMENTS

| | | | |
|---|---|---|---|
| 4,053,204 | 10/1977 | Miller | 350/96.31 |
| 4,128,301 | 12/1978 | Burns et al. | 350/96.15 |
| 4,678,267 | 7/1987 | Burns et al. | 350/96.15 |
| 4,737,004 | 4/1988 | Amitay et al. | 350/96.15 |
| 4,795,228 | 1/1989 | Schneider | 350/96.18 |
| 4,796,968 | 1/1989 | Coccoli et al. | 350/99.15 |

*Primary Examiner*—Frank Gonzalez
*Attorney, Agent, or Firm*—William J. Simmons, Jr.

[57] ABSTRACT

Disclosed is a mode field modifier which can be used in a fiber-to-fiber connector or a source-to-fiber connector. In a downtaper-type mode field modifier embodiment, the modifier comprises a modifier core of refractive index $n_1$ surrounded by first and second cladding layers having refractive indices $n_2$ and $n_3$, respectively. In an uptaper-type mode field modifier embodiment, the modifier comprises a modifier core of refractive index $n_1$ surrounded by a cladding layer having a refractive index $n_2$. The refractive indices are such that $n_1 > n_2 > n_3$. In both embodiments, there is a nonadiabatic taper intermediate the ends of the mode field modifier, whereby a substantial amount of mode coupling occurs therein.

11 Claims, 5 Drawing Sheets

NON-ADIABATICALLY-TAPERED CONNECTOR

CROSS-REFERENCE TO RELATED APPLICATION

This application is related to U.S. Pat. No. 4,763,976 (issued on Aug. 16, 1988) (Nolan et al.) filed on May 21, 1987.

BACKGROUND OF THE INVENTION

This invention relates to optical fiber connectors, and, more particularly, to connectors which are capable of connecting an optical fiber to a source or to another optical fiber with very low loss and with little sensitivity to lateral misalignment.

Although the present invention finds utility in the coupling of light from a source to an optical fiber, the present discussion concerning connector alignment problems will be limited to fiber-to-fiber connectors. The butt connection between the ends of two optical fibers will result in an insertion loss that is caused by various fiber misalignment parameters, examples of which are: (a) lateral misalignment between the axes of the two fibers, (b) longitudinal separation between the endfaces of the two fibers, and (c) angular misalignment between the axes of the two fibers. Since the butted fiber arrangement, wherein the two fiber endfaces are adjacent one another, is particularly sensitive to lateral displacement, this type of connector is difficult to use in field applications.

Beam expanders employing lenses or tapered fibers have been employed in in-line connectors for single-mode fibers which are extremely sensitive to lateral misalignment due to the small core diameters thereof. Although such beam expanders exhibit a reduced sensitivity to lateral displacement, they are more sensitive to angular misalignment. The art of aligning two connector halves is sufficiently advanced that such increased sensitivity to angular misalignment can be tolerated. Expanded beam connectors are therefore receiving a considerable amount of attention. However, the cost of lens-type expanded beam connectors is so high that they have not achieved widespread use.

The basic principal of tapered expanded beam connectors of the downtaper type is described in the publication K. P. Jedrzejewski et al. "Tapered-Beam Expander for Single-Mode Optical-Fiber Gap Devices", *Electronics Letters*, 16th January 1986, vol. 22, No. 2, pp. 105–106. That publication teaches a connector of the type wherein a single-mode fiber having a core refractive index $n_1$ and a cladding refractive index $n_2$ is threaded through a capillary tube of glass having a refractive index $n_3$ which is slightly lower than $n_2$. The capillary tube is uniformly heated to collapse it about the fiber. The central region of the combined fiber and capillary tube is then tapered to a minimum neck diameter of 40 μm, which is appropriate for fiber handling and cleaving. A taper ratio of 4:1 is said to be adequate for minimizing insertion loss. The field is initially guided by, and substantially confined to, the core of the single-mode fiber. As the energy propagates through the taper toward the small diameter end thereof, the field spreads out and is eventually no longer guided by the core but is effectively guided by the waveguide consisting of the cladding and the capillary tube. The Jedrzejewski et al. publication teaches that the taper should be adiabatic since such a taper will suffer negligible loss through mode coupling, and equations are set forth therein defining the condition for a taper to remain adiabatic. The requirement that the taper be adiabatic has been heretofore widely accepted because it has been thought that all of the power coupled to modes other than the fundamental mode will be lost, thereby resulting in an unacceptable connector loss. In an adiabatically tapered structure such as that disclosed by Jedrzejewski et al., wherein the total coupler length of both connector halves is 2 cm (about the minimum adiabatic length), a maximum beam expansion of approximately four times can be achieved. The required length for such adiabatic connectors increases roughly quadratically with increased beam expansion.

It has also been thought that tapered beam expanders of the up taper type should be adiabatically tapered. Such uptapered beam expanders are described in the publications: N. Amitay et al., "Optical Fiber Tapers - A Novel Approach to Self-Aligned Beam Expansion and Single-Mode Hardware", *Journal of Lightwave Technology*, vol. LT-5, No. 1, January 1987, pp. 70–76; D. Marcuse, "Mode Conversion in Optical Fibers with Monotonically Increasing Core Radius", *Journal of Lightwave Technology*, vol. LT-5, No. 1, January 1987, pp. 125–133; and H. M. Presby et al., "Optical Fiber Tapers at 1.3 μm for Self-Aligned Beam Expansion and Single-Mode Hardware", *Journal of Lightwave Technology*, vol. LT-5, No. 8, August 1987, pp. 1123–1128. The Amitay et al. and the Marcuse publications state that conversion of the fundamental mode to higher-order modes or radiation by the taper, which at the enlarged end can support multimode propagation, must be negligible if a very low excess coupling loss is to be maintained. The Presby et al. publication states that losses exceeding 1 dB are incurred for tapers having lengths up to 1 cm and that for longer lengths, i.e., more gradual tapers, the loss decreases. Presby et al. also state that a relatively gradual and smooth transition from fiber to taper takes place over a length of about 6 cm and that no significant amount of mode conversion takes place in the taper. Such adiabatic taper lengths would result in inordinately long connectors.

The efficient coupling of light from a source to an optical fiber is also an important requirement in optical transmission systems. The design of a local area network or subscriber loop is critically dependent on the available optical power. As light propagates through the system, loss occurs, and eventually the optical power level becomes too low to be reliably detected. By increasing the efficiency of coupling light from a source such as a laser diode or LED into a single-mode fiber, system performance would be significantly enhanced. Various advantages could result from such an improvement. For example, low cost LED's might be substituted for high cost laser diodes.

Various methods are currently used to couple light from a source into a fiber, including butt-coupling, spherical and aspheric lenses, gradient-index lenses, and adiabatically tapered fibers. These methods can alter the alignment requirements for the fiber, but they cannot offer significant improvements in coupling efficiency because of modal-volume conservation.

SUMMARY OF THE INVENTION

It is therefore an object of the present invention to provide a tapered beam expander the length of which is shorter than that of conventional tapered fiber beam expanders. Another object is to provide a tapered beam expander that is capable of providing relatively large beam expansion in relatively short distance. A further object is to provide an optical signal connector having an increased coupling efficiency.

Briefly, the present invention relates to a mode field modifier for coupling a transmission optical fiber to a source of light such as another mode field modifier or light generating means such as a laser or LED. Two such mode field modifiers can be connected end-to-end with their axes in substantial alignment to effect a low loss connection between fibers connected thereto. The present mode field modifier is also useful for connecting an optical fiber to a light source or detector. The modifier comprises a modifier core having a refractive index $n_1$ surrounded by cladding means having a refractive index that is less than $n_1$. Intermediate the ends of the mode field modifier is a tapered region which is characterized in that it has a nonadiabatic taper, whereby a significant amount of mode coupling occurs therein. The mode field modifier preferably comprises an adiabatic region of sufficient length that the relative phases of the modes at the junction between the adiabatic and tapered regions have that relationship which is necessary to substantially couple the maximum possible amount of the energy from the source to the transmission optical fiber. The length of the adiabatic region depends upon such factors as the length and taper angle of the tapered region, and the refractive indices of the core and cladding means.

In one embodiment the small diameter end is located adjacent the source, the portion of the modifier at the small diameter end constituting the adiabatic region. In addition, the cladding means comprises a first cladding layer of refractive index $n_2$ surrounding the modifier core and a second cladding layer of refractive index $n_3$ on the surface of the first cladding layer, $n_2$ being greater than $n_3$. The diameters of at least the core and first cladding layer at the large diameter end are greater than the corresponding diameters at the small diameter end, whereby the mode field of an optical signal propagating in one end of the modifier is modified as it propagates through the tapered region. The diameters of the core and first cladding layer at the small diameter end are sufficiently small that the field of a signal propagating in the large diameter end of the modifier toward the small diameter end thereof spreads and is effectively guided by the waveguide consisting of the first and second claddings.

In another embodiment the large diameter end is located adjacent the source, and the portion of the modifier at the large diameter end constitutes the adiabatic region.

For a given beam expansion, the axial length of a non-adiabatically tapered region of the present coupler can be much shorter than an adiabatically tapered region of a conventional mode field modifier. Because of the large beam expansion that can be achieved, the present connector is especially useful for connecting light sources to single-mode optical fibers having small core diameters.

DESCRIPTION OF THE PREFERRED EMBODIMENT

Figure 1:
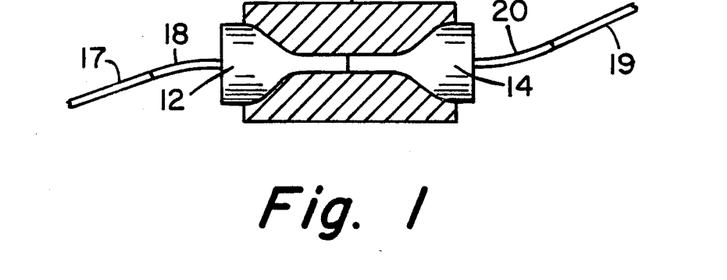
FIG. 1 is a partial cross-sectional view of an in-line downtaper fiber connector employing two mode field modifiers.

FIG. 1 shows an in-line fiber-to-fiber connector of the downtaper mode field diameter modification type. Two connector halves or mode field modifiers 12 and 14 are secured together in axial alignment by sleeve 16. Transmission optical fibers 17 and 19, which are to be connected to one another, are fused to or are mechanically connected to the short fibers or "pigtails" 18 and 20 which extend from the large diameter ends of mode field modifiers 12 and 14, respectively. When an optical signal is to be coupled from fiber 17 to fiber 19, modifier 12 is referred to as the input modifier. An optical signal propagating in fibers 17 and 18 is coupled to the core of input mode field modifier 12. As this signal propagates toward the small diameter end of modifier 12, the mode field diameter expands, the expanded beam coupling into the small diameter end of mode field modifier 14. Because of the large size of the beam at the small diameter ends, the expanded beam connector is much less sensitive to lateral misalignment. As the signal propagates through output mode field modifier 14, the mode field contracts as the energy traverses the up-taper of that modifier.

Figure 2:
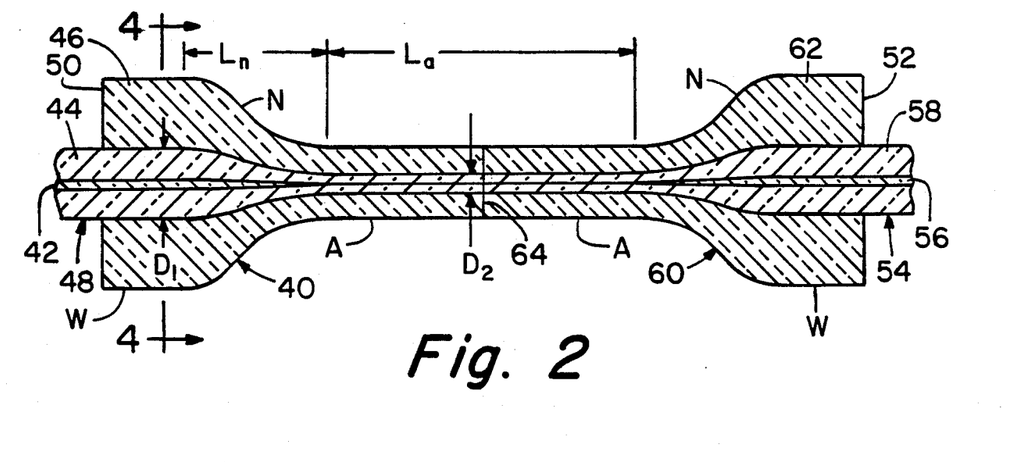
FIG. 2 is a cross-sectional view of the mode field modifiers of FIG. 1.
Figure 3:
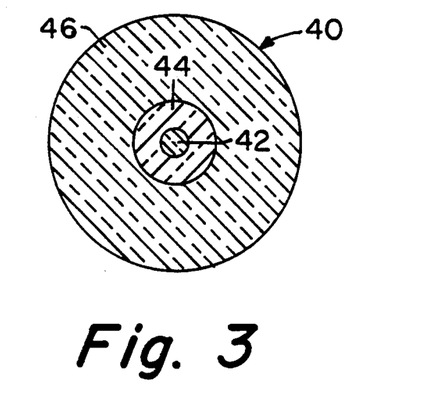
FIG. 3 is a cross-sectional view taken along lines 4—4 of FIG. 2.
Figure 4:
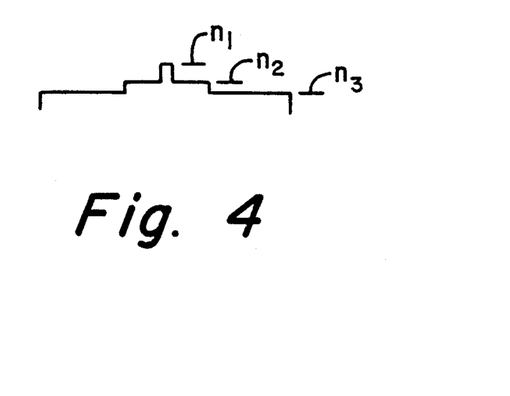
FIG. 4 is the refractive index profile of the large diameter end of the mode field modifier of FIG. 2.

The simplest embodiment of the fiber-to-fiber connector of the present invention is shown in greater detail in FIGS. 2 and 3, and the refractive index profile of the large diameter end thereof is shown in FIG. 4. Mode field modifier 40 comprises a core 42 of refractive index $n_1$ surrounded by concentric cladding layers 44 and 46 having refractive indices $n_2$ and $n_3$, respectively, wherein $n_1 > n_2 > n_3$. Core 42 and cladding 44 constitute an optical fiber pigtail 48 which extends from endface 50 of second cladding layer 46. Mode field modifier 60 is similarly formed of core 56, first cladding layer 58 and second cladding layer 62, core 56 and cladding layer 58 constituting a fiber pigtail 54 which extends from endface 52. The refractive indices of core 56 and cladding layers 58 and 62 are preferably $n_1$, $n_2$ and $n_3$, respectively. Each of the mode field modifiers 40 and 60 is illustrated as comprising a large diameter region W and a small diameter region A joined by a tapered region N. The two regions A are adiabatic regions wherein substantially no mode coupling occurs. In the embodiment shown in FIG. 2, the diameters of regions A are either substantially constant, or they may contain an insignificant amount of taper depending upon the fabrication technique. For either of these variations of the illustrated embodiment, the amount of taper, if any, is insufficient to provide more than an insignificant amount of beam expansion. In an alternative embodiment, the amount of adiabatic taper in region A would be sufficient to provide some measurable amount of beam expansion that is additive with the beam expansion that is caused by nonadiabatic region N. The endface of one of the regions A is positioned adjacent the corresponding endface of the other region A to form interface 64. The axial lengths of regions W are not critical, and the lengths of these regions may, insofar as device operation is concerned, be zero. As a practical matter, it may be easier to construct mode field modifiers having regions W of finite length. The combined length of both regions A, which is equal to $L_a$, is critical, as will be hereinafter described. Although the lengths of adiabatic regions A of devices 40 and 60 are preferably $\frac{1}{2} L_a$, those lengths could be unequal, provided they total $L_a$.

It is known that the diameters of at least the cores and first cladding layers must change intermediate endfaces 50 and 52 and interface 64 for devices 40 and 60 to function as mode field modifiers. As stated above, regions N were heretofore adiabatically tapered since it was thought that otherwise, all of the power coupled to modes other than the fundamental mode would be lost. As indicated in the aforementioned Jedrzejewski et al. publication, the maximum adiabatic taper for a tapered single-mode fiber is given by $$\left|\frac{da}{dz}\right| \leq \frac{a}{z_b} \tag{1}$$

where a is the radius of the core at a given point along the taper and the beat length $z_b$ is given by $$z_b = 2\pi/(\beta_1 - \beta_2) \tag{2}$$

where $\beta_1$ is the propagation constant of the fundamental mode (designated the $HE_{11}$ or $LP_{01}$ mode) and $\beta_2$ is the propagation constant of the first higher order mode which can couple to the fundamental mode (usually the $HE_{12}$ or $LP_{02}$ mode). The term z is the distance along the axis of the connector.

In accordance with the present invention a low loss connector is formed with nonadiabatically tapered regions N, i.e. they have taper angles defined by the relationship $$\left|\frac{da}{dz}\right| > \frac{a}{z_b} \tag{3}$$

whereby a substantial amount of mode coupling occurs therein. As a result of the modification of the present invention, length $L_n$ of the tapered region is much shorter than that of an adiabatic taper capable of providing the same beam expansion. If the length of a connector constructed in accordance with the present invention is about the same as that of an adiabatic device, the beam expansion achieved by the connector of the present invention can be much larger than that of the adiabatic connector.

The above-described connector can be fabricated by the technique described in the aforementioned Jedrzejewski et al. publication. A length of single-mode fiber is selected to provide the desired pigtail lengths. After the coating is stripped from a central portion of the fiber, it is threaded through a glass capillary tube, and the stripped portion of the fiber is centered in the tube. The tube has a lower softening point temperature and a lower refractive index than the fiber cladding. The tube is collapsed onto the fiber by heating the tube to its softening point. The method and apparatus described in U.S. Pat. No. 4,799,949 issued 1/24/89 (which is incorporated herein by reference) may be employed to stretch the central portion of the collapsed tube, thereby forming tapered regions N and small diameter regions A, the length of which is greater than $L_a$. The resultant double-tapered device is cleaved to separate it into two halves, and the length of each region A is adjusted to the desired value in the manner described hereinbelow.

It has been found that low insertion loss can be achieved in a nonadiabatically tapered connector by optimizing the following variables: (a) refractive index profile, (b) taper profile, and (c) length $L_a$, which is the combined lengths of the adiabatic regions A of mode field modifiers 40 and 60. The shapes of tapered region N and adiabatic region A are to some extent determined by the fabrication process. With adequate process control of the shapes, they could be used as additional design parameters.

The refractive index profile and taper ratio are determined by the desired amount of beam expansion, the loss tolerances which are acceptable, and practical fabrication requirements such as the ability to minimize glass expansion mismatches and the ability to control the index profile and taper geometry. When the mode field modifier is formed by conventional techniques, whereby diameter $D_1$ is proportional to the outside diameter (OD) of region W, and diameter $D_2$ is proportional to the OD of region A, the taper ratio is equal to the ratio of the OD of region W to the OD of region A. The taper profile (the length, shape and taper ratio thereof) and the index profile control the amount of inter-mode coupling and the cutoffs of higher order modes. Length $L_a$ sets the phase difference between the power-carrying modes, which is a critical parameter for fiber-to-fiber connectors that ensures that most of the power is coupled back into the fundamental mode in the up-taper of the output mode field modifier.

Computer modeling has shown that a single-mode fiber-to-fiber connector can be designed such that the fundamental mode of the input fiber is converted to 2, 3 or 4 modes which propagate in adiabatic region A. Designs resulting in the propagation of more than four modes in region A are also possible. An appropriate length $L_a$ can be calculated which will result in the proper phasing of the modes to obtain maximum conversion to the fundamental mode in the output mode modifier. The principle of the present invention is also applicable to connectors for few-moded transmission fibers such as two-mode fibers. To connect two n-moded fibers, a similar analysis can be performed to determine the shape and length of the tapered region to generate at least (n+1) power-carrying modes in region A and to determine the proper length $L_a$ for achieving maximum combination of the down-converted modes in the output mode field modifier.

The ability of the connector packaging to control angular offset between the two mode field modifiers limits the maximum amount of beam expansion that can be employed, since the sensitivity of the connector to angular offset increases with increased beam expansion. By "packaging" is meant that support/alignment mechanism (schematically represented by sleeve 16 of FIG. 1) a function of which is to control the axial and lateral alignment of the mode field modifiers. Because this nonadiabatic design allows for significantly shortened connectors, the overall maximum length (between endfaces 50 and 52) will be primarily determined by packaging considerations necessary to provide adequate angular alignment rather than by a need to provide an adequate beam expansion.

When designing a connector, the type of fibers to be connected must be taken into consideration. The number of modes propagating at the small diameter end of the taper and the phase relationship of those modes can be theoretically determined for any given taper. Knowing the mode distribution of the energy in the input fiber and the mode conversion and propagation characteristics of the tapered regions, the total length $L_a$ of the two adiabatic regions A is then determined in order to ensure low loss at the wavelengths of interest. Standard coupled local mode theory can be used. Since this theory is well known, it is only briefly outlined here.

In coupled mode theory, the solution to the scalar wave equation, $\Psi(x,y,z)$, where positive z is the direction of optical propagation, can be expanded in terms of the local modes of the waveguide, $\Psi(x,y;z)$, where z is now a parameter which allows the normal modes to vary as the waveguide is tapered. This expansion can be written as:

$$\Psi = \sum_j c_j(z)\Psi_j \exp\left(i \int_0^z \beta_j(z')dz'\right) \quad (4)$$

where the $c_j$ are the expansion coefficients and the $B_j$ are the propagation constants. The coupled local mode equations are then $$\frac{dc_j}{dz} = \sum_k D_{jk}(z)c_k(z)\exp\left(-i \int_0^z [\beta_j(z') - \beta_k(z')]dz'\right) \quad (5)$$

where the coupling matrix is $$D_{jk} = \frac{1}{2n_{core}} \frac{k}{\beta_j - \beta_k} \int \frac{\partial n^2}{\partial z} \frac{\Psi_j \Psi_k}{\chi_j \chi_k} dA \quad (6)$$

and the normalization is $$\chi_j = [\int \Psi_j^2 dA]^{\frac{1}{2}} \quad (7)$$

The local modes at any point in the connector may be obtained using finite element analysis, which is another standard technique in the field, or, in the case of step-index profiles, the equations for the local modes may be written down exactly. Using these solutions, along with initial conditions appropriate to the desired input to the device, equation (5), the above-written coupled mode equation, can be numerically integrated for a variety of lengths until the correct length for maximum transmission is found.

The following theoretical example is presented to illustrate the design of a non-adiabatically tapered connector, reference being made to FIG. 2. A commercially available single-mode optical fiber, hereinafter referred to as a type SM single-mode fiber, was selected for use in the fabrication of the connector. The resultant connector will therefore be well suited for connecting two similar single-mode fibers. An operating wavelength of 1300 nm is assumed. The selected fiber has a $GeO_2$-doped $SiO_2$ core ($n_1 = 1.451278$ at 1300 nm) and a $SiO_2$ cladding ($n_2 = 1.446918$); $\Delta_{12}$ of the fiber is 0.3%. The symbol $\Delta_2$ is the relative index difference, e.g. $\Delta_{12} = (n_1^2 - n_2^2)/2n_1^2$. The core $r_1$ is 4.0 $\mu$m and the cladding radius $r_2$ is 62.5 $\mu$m. The diameter $D_1$ is therefore 125 $\mu$m.

It is assumed that the length of sections W is set by processing conditions, or perhaps, by mechanical mounting conditions in the connector package, and that length is used in specifying the maximum overall length of the connector.

It is necessary to specify a clad-overclad delta, $\Delta_{23}$. A low value of $\Delta_{23}$ gives a mode expansion which is a weaker function of taper ratio near the peak expansion (and therefore mode expansion is less sensitive to process variations). However, the process of stretching and forming the connector becomes more difficult for very low values of $\Delta_{23}$ because the overclad softening point is very close to the clad softening point, and fiber distortions occur in the taper region. In addition, the fibers become more susceptible to bending loss with low values of $\Delta_{23}$. It has been found that, for the types of glasses described herein, the process works best with values of $\Delta_{23}$ between 0.1% and 0.3%, and for the purpose of this example, $\Delta_{23}$ will be chosen to be 0.15%. To provide such a delta value with respect to silica, a borosilicate tube can be employed as the outer cladding.

Given this value of $\Delta_{23}$, one can calculate the overclad radius needed for the desired beam expansion and the corresponding taper ratio. It is known that the beam expansion reaches a local maximum near a taper ratio of approximately 4:1, depending on the index profile, and a taper ratio near this maximum expansion point is selected for this example. In the case of the step index profile of the present example, this calculation can be done exactly (see, for example, M. J. Adams, *An Introduction to Optical Waveguides*, Wiley, NY, 1981). For the present example, wherein $r_2$ is 62.5 μm, a taper ratio of 5:1 will be specified. This value of taper ratio is not chosen for optimized expansion, but rather, for simplicity of the results, since with these values of $r_2$ and taper ratio, only two modes propagate in the adiabatic regions A, and the results are more simple than those obtained for a larger number of modes. Due to the predetermined taper ratio, $D_2$ is 25 μm.

Finally, a length and shape for the nonadiabatic taper region must be set. As will be discussed below, the length of the adiabatic region $L_a$ needed for optimum performance is determined by the different propagation constants of the modes in the adiabatic region. Because of this, and because the length $L_a$ will also change depending on the shape and length of the nonadiabatic taper, an iterative design procedure is needed. As a starting point, an estimate for $L_a$ can be obtained by determining the beat length of the two lowest modes in the adiabatic regions A. The beating of these modes will dominate the behavior of the transmission into the output fundamental mode, and so $L_a$ can be initially estimated to be approximately this length. A maximum acceptable connector length ($L_a = 2L_n$) is set by packaging considerations. The shape will be set by fabrication methods. For the purposes of this example, a value of $L_n = 800$ μm will be chosen because such a short taper shows pronounced nonadiabatic effects. A simple cosine shape for the nonadiabatic taper will be chosen:

$$\frac{r_1(z)}{r_1(0)} = \frac{r_2(z)}{r_2(0)} = \frac{1}{2}\left(1 + \frac{1}{R}\right) + \frac{1}{2}\left(1 - \frac{1}{R}\right)\cos\left(\frac{\pi z}{L_n}\right) \quad (8)$$

where R is the taper ratio ($R = D_1/D_2 = 5.0$) and z is the distance along the axis from the start of the nonadiabatic taper. The adiabatic region is assumed to be of constant radius.

Figure 5:
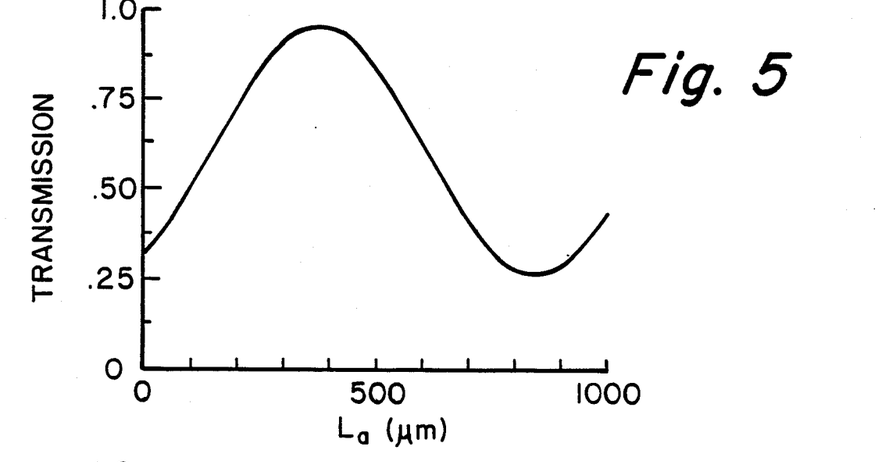
FIG. 5 is a graph illustrating the calculated relationship between the length $L_a$ of the adiabatic regions of a connector and the light transmission therethrough.

Using the above parameters, the coupled mode equation (5) are numerically integrated along the connector for various lengths $L_a$ until a length is found for which the transmission through the device and into the fundamental mode of the output fiber is optimized for the wavelength of interest (1300 nm). Following this method, the graph of FIG. 5 was obtained. As shown in this figure, the output of this connector, as measured by the power of the fundamental mode propagating in output fiber 54, varies dramatically with changes in the length $L_a$ of the adiabatic region. The sinusoidal variation has a period of 930 μm, which is the beat length of the two modes which propagate in the adiabatic region. The model reveals that about 30% of the power has been transferred out of the fundamental mode at the beginning of the adiabatic region. The small loss at the maximum transmission point is the result of power lost to a higher mode which is cut off in the down taper of the input mode field modifier.

For the case modeled here, there is a length $L_a = 380$ μm for which the transmission is over 96%. The length tolerance needed to maintain a transmission of over 90% is on the order of 0.1 mm, which should not be difficult to fabricate. It should be noted that the curve of FIG. 5 would repeat itself as $L_a$ is increased, so that it would exhibit additional maxima at values of $L_a$ of about 1310 μm, about 2240 μm, etc.

A device with a larger value of $\Delta_{23}$ and/or a larger value of $r_2$ can have more than just two propagating modes in the adiabatic region. In such cases the same design procedure can be followed, but the transmission curve will have a more complex structure which is characteristic of that number of modes beating against one another.

Figure 6:
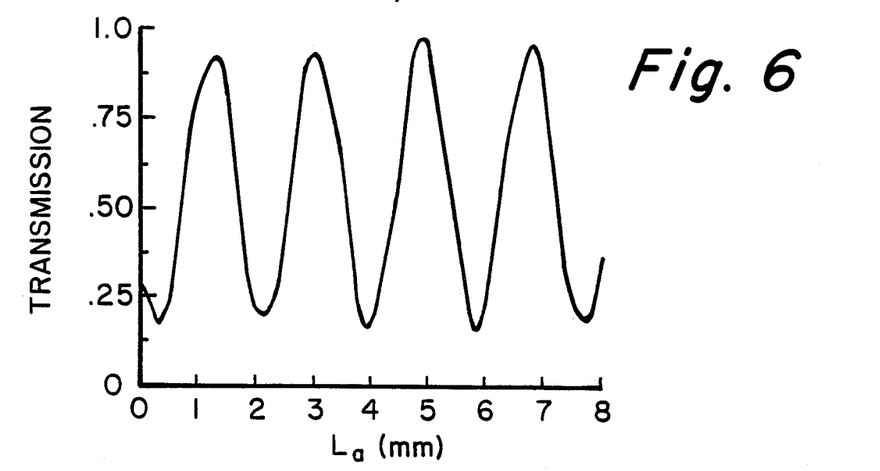
FIG. 6 is a plot of calculated length $L_a$ versus light transmission for a connector design wherein taper ratio is optimized to achieve maximum beam expansion.

For the index profile modeled above, the maximum beam expansion occurs for a taper ratio of 3.319. FIG. 6 shows the transmission into the fundamental mode of the output fiber for this device. The behavior is somewhat more complex than in the previous example, because there are three modes propagating in the adiabatic region A. Again there is an adiabatic length, $L_a = 4480$ μm, for which very high transmission (greater than 99%) is possible.

In order to experimentally demonstrate these effects, a device was fabricated using a length of single-mode fiber wherein the core diameter $r_1$ was 4.0 μm, the cladding diameter $r_2$ was 150 μm, the core index $n_1$ was 1.461, and $\Delta_{12}$ was 0.3%. The second cladding layer was a borosilicate tube having a 2.8 mm outside diameter, a 350 μm inside diameter, and a refractive index such that $\Delta_{23}$ was 0.15%. The tube was collapsed, and a double-tapered device was formed, the final taper ratio being 5.5 (which is larger than for optimal beam expansion). The actual taper shape was complex, but it can be fairly well approximated using the aforementioned cosine shape with a nonadiabatic taper length $L_n = 3.1$ mm.

The resultant double-tapered device was tested by measuring the throughput thereof into the fundamental mode of the output fiber as a function of wavelength. The length of the adiabatic region was approximately 16 mm. Light from a monochromator was launched into 2 km of the above-described type SM single-mode fiber. The output of this fiber was input into the pigtail of the nonadiabatic device, and the output of the device was input into another 2 km length of type SM single-mode fiber. These long lengths of launch and collect fibers were used to ensure that only light from the fundamental mode of the device was excited in the input to the device and measured at the output of the device.

Figure 7:
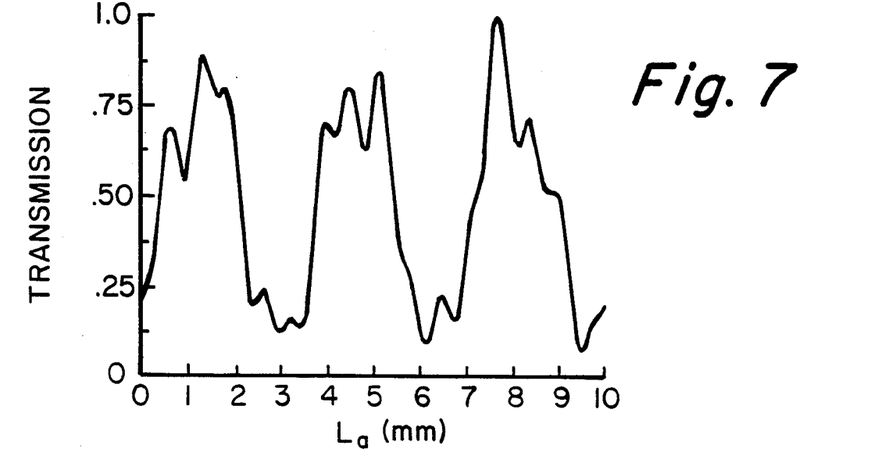
FIG. 7 is the calculated transmission function of a tested device.
Figure 8:
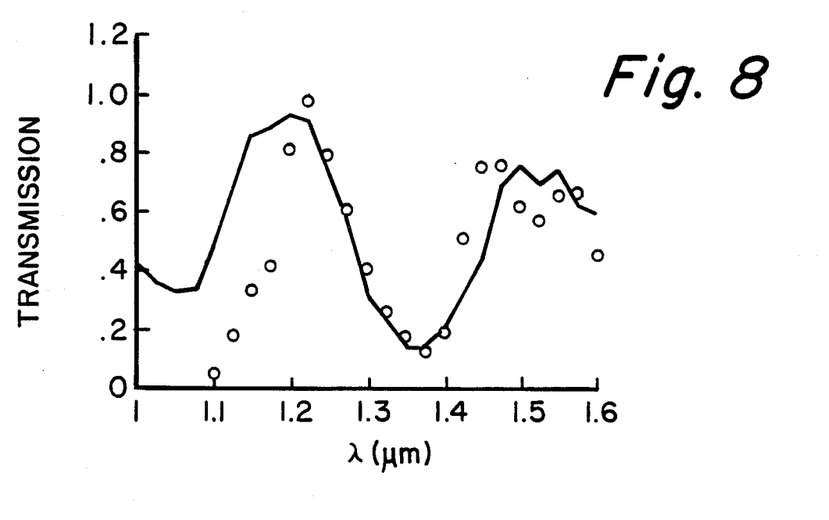
FIG. 8 is a graph wherein transmission is plotted as a function of wavelength, the solid line pertaining to measured values of an actual device and the circles designating calculated points.

The calculated transmission function of the tested device at 1300 nm is plotted as a function of length $L_a$ in FIG. 7. Four modes propagate in the adiabatic regions A. Similar calculations were performed for a variety of wavelengths, and the wavelength dependence of the transmission as a function of length $L_a$ was determined. The best fit to the experimental data was for a length $L_a = 15.60$ mm, which is within the error of the approximate determination of this length mentioned above. In FIG. 8 the transmission is plotted as a function of wavelength for the actual device (solid line) and the calculation (circles). Greater than 90% transmission was obtained at 1200 nm in the measured device. The reasonably good agreement between experiment and theory for wavelengths above 1200 nm indicates that the device indeed shows the expected nonadiabatic effects. Below 1200 nm the type SM single-mode fibers are multi-moded; therefore, the launch and collect conditions are more complex than the model assumptions, and deviations in this region are to be expected.

A nonadiabatically tapered connector designed in accordance with the present invention can achieve a beam expansion of four times with a "minimum required connector length" ($L_a+2L_n$) less than 4 mm. Only small increases in length are needed for greater amounts of beam expansion when a nonadiabatic taper is utilized. A connector having adiabatic tapers would require a total length of 2 cm, which is roughly the minimum adiabatic length, to achieve a four times beam expansion, and the required length of that type of connector increases roughly quadratically with increased beam expansion.

Figure 9:
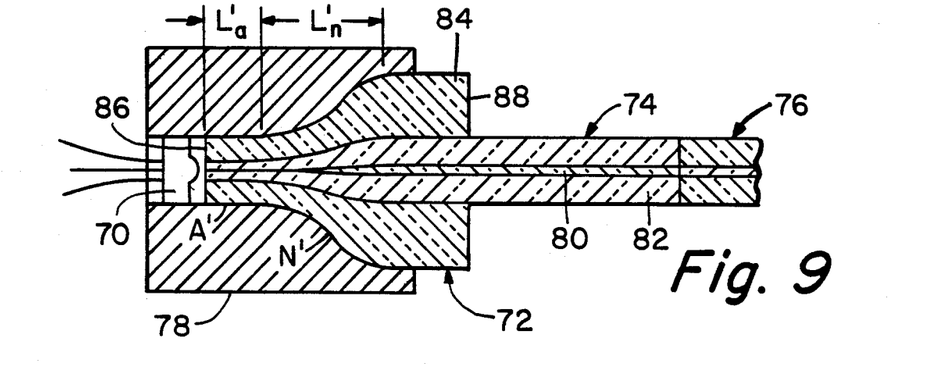
FIG. 9 is a cross-sectional view of an uptaper mode field modifier connection between an optical fiber and a light source.

A nonadiabatically tapered mode field modifier can also increase the coupling efficiency of a source-to-fiber connector. As shown in FIG. 9, light from a source such as LED 70 is coupled to into nonadiabatic connector 72 having fiber pigtail 74 to which transmission fiber 76 is connected. Housing 78 contains a cavity for positioning source 70 in proper alignment with the small diameter endface 86 of modifier 72. Mode field modifier 72 comprises a core 80 of refractive index $n_1$ surrounded by concentric cladding layers 82 and 84 having refractive indices $n_2$ and $n_3$, respectively the relationships of which are similar to the refractive indices described in conjunction with FIG. 2. The refractive index profile of connector 72 is similar to that illustrated in FIG. 4. Core 80 and cladding 82 constitute fiber pigtail 74, which extends from endface 86 of modifier 72. Modifier 72 comprises tapered region N' of length $L_n'$ and adiabatic region A' of length $L_a'$. Light from source 70 impinges upon endface 86 and excites all of the propagating local modes. For a prior art adiabatically tapered connector, only power in the fundamental mode of the connector will couple into the fundamental mode of a single-mode fiber. Because the present nonadiabatically-tapered connector employs inter-modal power transfer, the power from several modes can be coupled into a single output mode. Thus, it is possible to choose a nonadiabatic design which couples most of the power from all the modes propagating in region A' into the fundamental mode that propagates in the single-mode fiber 74. The power coupling enhancement depends on the source and the number of coupled modes.

The objective of this design is to maximize the power launched into the output single-mode or few-mode fiber. Ultimately, the design of a source-fiber connector might involve a trade-off between this and other requirements such as sensitivity to offset tolerances, but these factors are not taken into consideration in the present example. The first step in designing a source-fiber connector is to specify the source and output single-mode fiber parameters. The output field pattern of the source is required for modeling purposes. Additionally, packaging and process requirements will provide limits on the overall length of the device and on the clad overclad delta, $\Delta_{23}$.

Ideally, the output field distribution of a source would be exactly matched to the mode field of the fundamental mode of the single-mode fiber. In practice, of course, this is not the case, and the fields may be very different, depending on the source. As in the case of the fiber-to-fiber connector, it has been found that a source-to-fiber connector can be designed so that power launched into higher order modes of the connector, which always occurs because of the imperfect matching of the fields, can be coupled into the fundamental mode at the output, thereby resulting in increased output power. The amount of improvement compared to an adiabatic connector with the same expansion depends on the field distribution and coherence properties of the source. A highly coherent source with a field distribution closely matching the fundamental propagating mode field distribution of the connector would not be improved significantly, while a source with a very different field could be coupled much more efficiently into the output fiber.

To illustrate the potential improvement of a nonadiabatic connector as compared to an adiabatic one, consider the example where the input to the connector is a plane wave; such an input might be approximately provided by a laser with a large output beam diameter or by a significant source-connector separation. The fiber parameters $n_1$, $r_1$, and $\Delta_{12}$ are taken to be the same as in the previous fiber-to-fiber example wherein the type SM single-mode fiber was employed. It is also assumed that the clad-overclad delta, $\Delta_{23}$ is 0.15% and the wavelength is 1300 nm. Radius $r_2$ is again taken to be 62.5 μm, and a 5:1 final taper ratio is chosen.

The lengths $L_a$ and $L_n$ are determined in a different manner than in the fiber-to-fiber case. The objective is to couple all the light from the higher-order modes propagating at the coupler input into the fundamental mode at the output. Because the inter-modal coupling becomes stronger for sharper tapers, there is a maximum length $L_n'$ beyond which the coupling is not sufficiently strong to transfer all of the power. This maximum length must be determined by numerical integration of the coupled mode equations for a variety of taper lengths (and lengths $L_a'$). Shorter taper lengths will also give complete coupling for certain lengths $L_a'$, but, as the length $L_n'$ is made shorter, the appropriate length $L_a'$ for complete coupling varies more and more rapidly with slight variations in $L_n'$. The choice must then be made in light of process tolerance considerations and packaging requirements. For this particular choice of connector parameters, a length $L_n=800$ μm gives maximum coupling.

The theory for determining the length $L_a'$ of adiabatic region A' is essentially the same as in the fiber-to-fiber connector, with one significant change. Whereas the initial conditions for the fiber-to-fiber connector are determined by the modal power distribution in the input transmission fiber 17 (FIG. 1), the initial conditions for the present embodiment are determined by the overlap of the source light field with the normal modes of the connector at the input endface 86. If $\Psi_{source}$ is the field of the light source, then the initial values of the expansion parameters are given by $$c_j(0) = \frac{1}{\chi_j^2} \int \Psi_{source} \Psi_j dA \tag{9}$$

Using these conditions, the coupled local mode equation (5) can be integrated in the same manner as discussed above to obtain the optimum length $L_a'$.

Figure 10:
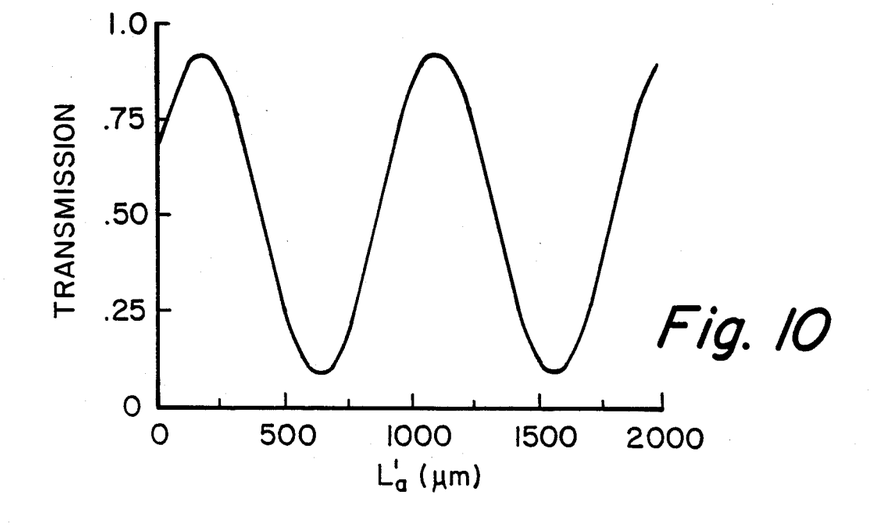
FIG. 10 is a graph illustrating the relationship between the length of the adiabatic region of the connector of FIG. 9 and the light transmission through that connector.

The output of the connector, as measured by power into the fundamental mode of the output fiber, is once again a sinusoidal function of the length $L_a'$, as is shown FIG. 10. In this figure, a transmission of 1.0 would signify that all of the power launched into both input modes has been coupled into the fundamental mode at the output. The actual maximum transmission is about 0.96, which represents a 76% increase in power over the adiabatic case. Having a larger number of modes propagating at the input of the connector allows even larger gains.

As is true with many optical fiber devices, the theory for predicting the behavior of such devices is well-defined, but the actual devices do not perform exactly as predicted. A certain amount of empirical tuning of any given device should be undertaken after the theoretical design is determined. For example, the length of the adiabatic region of either of the above-described embodiments could be made slightly longer than the calculated length. Small thicknesses can be removed by grinding and polishing, and the device can be tested by propagating light therethrough. When it appears that the device is operating at one of the maximum transmission peaks of the curve of either FIG. 5 or FIG. 10, for example, no further processing need be done. Since the percent transmission of adjacent maxima are substantially identical, it is immaterial which of the maxima is chosen for the length $L_n$ or $L_n'$.

The following modifications can be made to the present mode field modifier to give greater beam expansion or stronger mode coupling. In one modification the mode field modifier has a more complex refractive index profile such as that illustrated in FIG. 11. The publication W. J. Stewart et al., "Design Limitation on Tapers and Couplers in Single-Mode Fibers", Proc. IOPOC, 1985, pages 559–562 (FIGS. 4 and 5) teaches that such index structures have larger nonadiabatic effects than the structures discussed above in connection with FIG. 4. That is, the maximum adiabatic taper angle is smaller in the W-type index profiles of the type represented by FIG. 11. In the applications discussed herein, especially in the application of the source-fiber connector, strong mode coupling is desired. There may be practical (fabrication) limits as to how large a taper angle can be made, and so an index structure showing stronger nonadiabatic effects for a given taper might be desirable.

Figure 11:
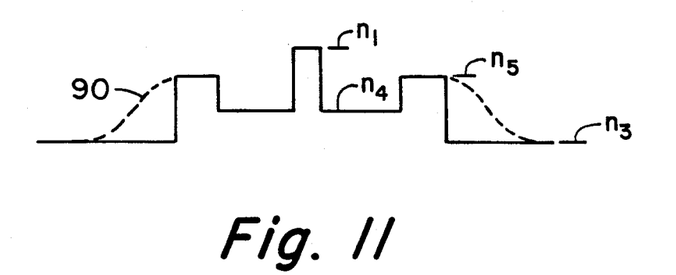
FIG. 11 illustrates a modified mode field modifier refractive index profile.

FIG. 11 also illustrates the fact that the refractive index profile need not be of the step type. Either by design or as a result of the manufacturing process, part or all of the profile can be rounded as illustrated by curve 90.

Figure 12:
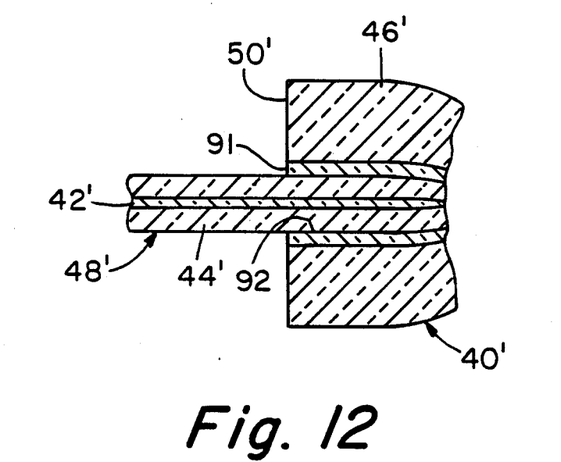
FIG. 12 is a cross-sectional view of another mode field modifier embodiment.

Another modification, which is illustrated in FIG. 12, is disclosed in the aforementioned Nolan et al. U.S. Pat. No. 4,763,976, which is incorporated herein by reference. In this embodiment, elements similar to those of FIG. 2, are represented by primed reference numerals. Fiber pigtail 48' extends from endface 50' of mode field modifier 40'. The refractive index of region 91 is preferably the same as that of fiber cladding 44' and is greater than that of region 46'. Cladding 44' and layer 91 therefore constitute the first cladding layer and region 46' constitutes the second cladding layer. To fabricate the device of FIG. 12, fiber 48' is inserted into an aperture 92 in a tube comprising concentric regions 91 and 46'. The tube is symmetrically heated to collapse it uniformly about fiber 48' The combination of the fiber and the tube is then tapered as described above in conjunction with FIG. 2, and the small diameter end is cleaved to form mode field modifier 40'. As taught in Pat. No. 4,763,976, the beam expansion is increased since the diameter of the first cladding layer of the mode field modifier is effectively larger than the cladding diameter of the transmission line fiber connected to the mode field modifier.

Figure 13:
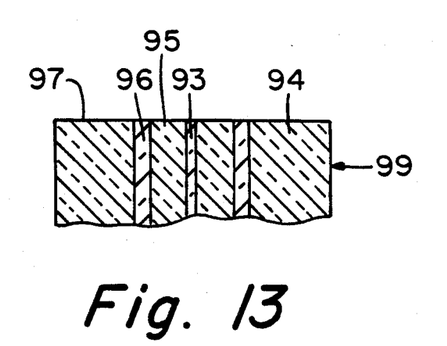
FIGS. 13 and 14 are cross-sectional views illustrating steps performed on the endface of a mode field modifier to form a fiber connecting well therein.
Figure 14:
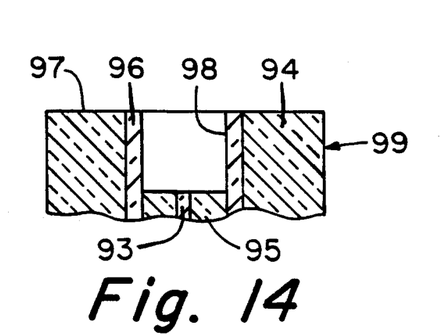

Instead of having a fiber pigtail extending from the endface thereof, the mode field modifier can be provided with an axial hole into which the end of a transmission line fiber can be inserted. A method of forming the fiber positioning hole is illustrated in FIGS. 13 and 14 in which the advantageous feature of FIG. 9 is also incorporated. In this embodiment, which is disclosed in U.S. Pat. No. 4,763,976, mode field modifier 99 comprises a core 93 and a second cladding layer 94 having optical characteristics similar to core 42 and second cladding 46 of FIG. 2, for example. The first cladding layer comprises concentric layers 95 and 96, the refractive index of layer 96 being equal to or less than that of layer 95. The compositions of layers 95 and 96 differ, the glass of layer 95 being more soluble in a given solvent than that of layer 96. Cladding 97 must be resistant to being dissolved in the given solvent. When end 97 of modifier 99 is immersed in the given solvent, layer 95 is more readily etched so that hole 98 of FIG. 14 is formed.

It is known that "gap" devices such as polarizers, Faraday isolators, and beamsplitters can be put into the gap between two beam expanding devices. For larger beam expansions, a larger gap can be tolerated for a given loss budget because the beam is better collimated. Such a gap device could be placed between the two adiabatic regions A of FIG. 2. Small gaps between mode field modifiers in a fiber-to-fiber connector can be essentially ignored. However, the calculation of the length of the adiabatic region must take into consideration the length of larger gaps.

Figure 15:
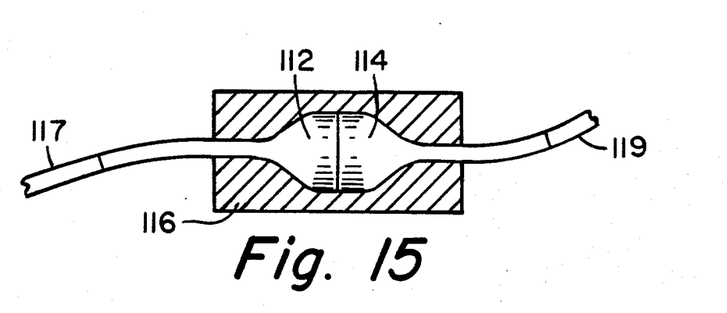
FIG. 15 is a partial cross-sectional view of an in-line uptaper fiber connector employing two mode field modifiers.

FIG. 15 shows an in-line fiber-to-fiber connector of the uptaper mode field diameter modification type. Two connector halves or mode field modifiers 112 and 114 are secured together in axial alignment by sleeve 116. Transmission optical fibers 117 and 119, which are to be connected to one another, are fused to or are mechanically connected to the pigtails which extend from the mode field modifiers. An optical signal propagating in fiber 117 is coupled to the core of input mode field modifier 112. As this signal propagates toward the large diameter end of modifier 112, the mode field diameter expands, the expanded beam coupling into the large diameter end of mode field modifier 114. As the signal propagates through output mode field modifier 114, the mode field contracts as the energy traverses the downtaper of that modifier.

Figure 16:
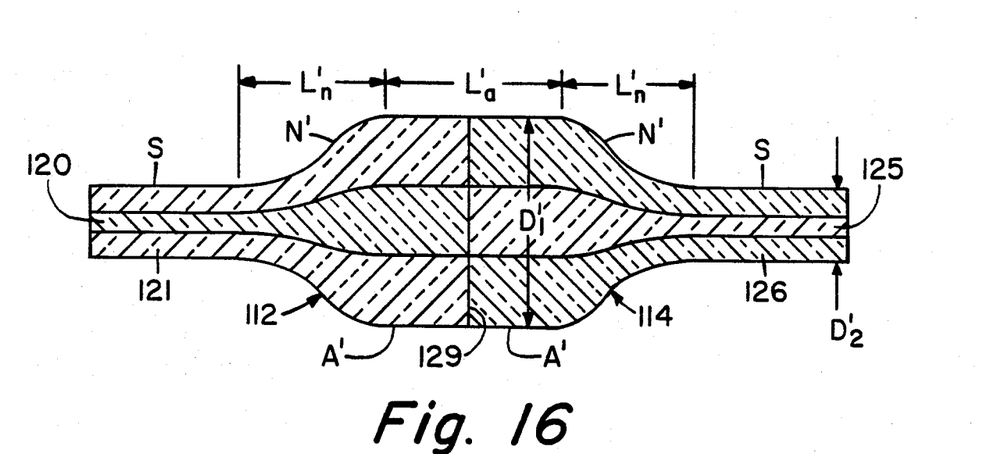
FIG. 16 is a cross-sectional view of an uptaper mode field modifier.
Figure 17:
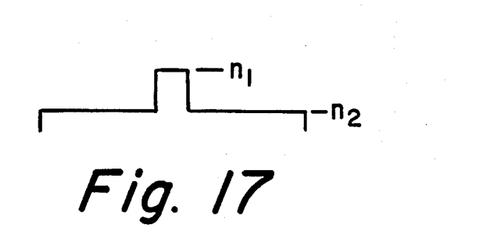
FIG. 17 is the refractive index profile of the mode field modifier of FIG. 16.

The uptaper fiber-to-fiber connector of the present invention is shown in greater detail in FIG. 16, and its refractive index profile is shown in FIG. 17. Mode field modifier 112 comprises a core 120 of refractive index $n_1$ surrounded by cladding layer 121 having refractive index $n_2$, wherein $n_1 > n_2$. The small diameter end of core 120 and cladding 121 constitute an optical fiber pigtail which is available for connection to transmission fiber 117. Mode field modifier 114 is similarly formed of core 125, and cladding layer 126, the small diameter end of which constitutes a fiber pigtail which is available for connection to transmission fiber 119. The refractive indices of core 125 and cladding 126 are preferably $n_1$ and $n_2$, respectively. Each of the mode field modifiers 112 and 114 is illustrated as comprising a large diameter region A' and a small diameter region S joined by a tapered region N'. The two regions A' are adiabatic regions wherein substantially no mode coupling occurs. In the embodiment shown in FIG. 16, the diameters of regions A' are either substantially constant, or they may contain an insignificant amount of taper depending upon the fabrication technique. For either of these variations of the illustrated embodiment, the amount of taper, if any, is insufficient to provide more than an insignificant amount of beam expansion. In an alternative embodiment, the amount of adiabatic taper in region A' would be sufficient to provide some measurable amount of beam expansion that is additive with the beam expansion that is caused by nonadiabatic region N'. The endface of one of the regions A' is positioned adjacent the corresponding endface of the other region A' to form interface 129. The axial lengths of regions S are not critical, but the lengths of these regions should be sufficiently long to make connection thereto. As described above in connection with downtaper connectors, the combined length $L_a'$ of both regions A' is critical. Although the lengths of adiabatic regions A' of devices 112 and 114 are preferably $\frac{1}{2}L_a'$, those lengths could be unequal.

In accordance with the present invention the connector of FIG. 16 is formed with nonadiabatically tapered regions N', i.e. they have taper angles defined by the relationship expressed by equation (3), whereby a substantial amount of mode coupling occurs therein. Therefore, length $L_n'$ of the tapered region is much shorter than that of an adiabatic taper capable of providing the same beam expansion.

Low insertion loss can be achieved in a nonadiabatically uptapered connector in a manner similar to that described above in connection with nonadiabatically downtapered connectors. The length $L_n'$ can be computed after the values of $n_1$, $n_2$, $D1'$, $D_2'$ and the length $L_n'$ and shape of region N' are known.

The design of a nonadiabatically uptapered fiber-to-fiber connector is illustrated by the following theoretical example. The connector is to be used to connect two of the aforementioned type SM single-mode fibers wherein core radius is 4.0 $\mu$m, $n_1$ is 1.451278 and $\mu$is 0.3%. The operating wavelength is again 1300 nm. The nonadiabatic taper region N' is to have a cosine shape and have a length of 500 $\mu$m. The final draw ratio $D_2'/D1$ to be 0.15.

Figure 18:
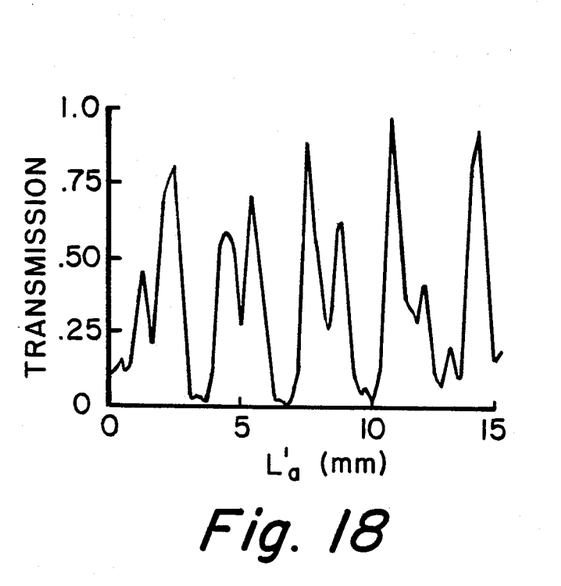
FIG. 18 is a graph illustrating the calculated relationship between the length $L_a'$ of the adiabatic regions of an uptaper connector and the light transmission therethrough.

The length of the adiabatic region $L_a'$ needed for optimum performance is determined in accordance with the above-described procedure. Using the above parameters, the coupled mode equation (5) are numerically integrated along the connector for various lengths $L_a'$ until a length is found for which the transmission through the device and into the fundamental mode of the output fiber is optimized for operation at 1300 nm. This results in the graph of FIG. 18 wherein the output of the connector, as measured by the power of the fundamental mode propagating in output fiber 119, varies dramatically with changes in the length $L_a'$ of the adiabatic regions. For the case modeled here, there is a length $L_a' = 10.83$ mm for which the transmission is about 97%.

Each of the devices 112 and 114 of FIG. 16 can be fabricated by forming a preform of diameter $D_1'$. The core/cladding diameter ratio is the same as that required for the single-mode pigtail of regions S. An end of the preform is heated and drawn to form a fiber of diameter $D_2'$ (125 $\mu$m). The preform can be severed at a point along its axis such that length of the large diameter region is slightly greater than $L_a'$. Small thicknesses can be removed by grinding and polishing, and the device can be tested by propagating light therethrough until it is apparent that the device is operating at one of the maximum transmission peaks of the curve of FIG. 18.

Figure 19:
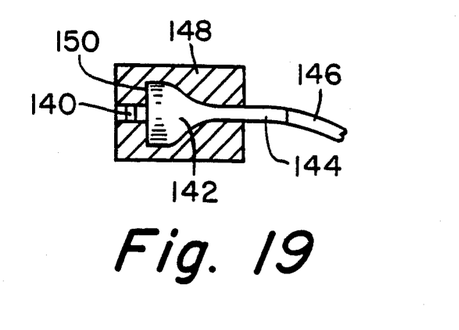
FIG. 19 is a partial cross-sectional view of an uptaper mode field modifier connection between an optical fiber and a light source.

A source-to-fiber uptaper connector is shown in FIG. 19 wherein light from source 140 is coupled to into the large diameter end of a nonadiabatic connector 142 having fiber pigtail 144 to which transmission fiber 146 is connected. Housing 148 contains a cavity for positioning source 140 in proper alignment with the adjacent endface 150 of modifier 142. Mode field modifier 142 is similar in construction to modifier 114 of FIG. 16. Light from source 140 impinges upon endface 150 and excites all of the propagating local modes. Because the nonadiabatically-tapered connector employs inter-modal power transfer, the power from several modes can be coupled into a single output mode. It is therefore possible to design a nonadiabatic uptaper device which couples most of the power from all the modes propagating in the large diameter adiabatic region into the fundamental mode that propagates in the single-mode pigtail 144. The amount of inter-mode power coupling in this device can be enhanced through the use of index profile modifications such as the W-profile illustrated in FIG. 11.

We claim:

1. A mode field modifier for coupling light from a source positioned adjacent one of the ends thereof to a transmission optical fiber positioned adjacent the opposite end thereof, said mode field modifier comprising
 a modifier core having a refractive index $n_1$,
 cladding means surrounding said modifier core, the refractive index of said cladding means being less than $n_1$, and
 a tapered region intermediate the ends of said mode field modifier, whereby said mode field modifier has a large diameter end and a small diameter end, the mode field of an optical signal propagating in one end of the modifier being modified as said signal propagates through said tapered region,
characterized in that said tapered region has a nonadiabatic taper, whereby a significant amount of mode coupling occurs therein and in that said mode field modifier further comprises an adiabatic region of sufficient length that the relative phases of the modes at the junction between said adiabatic and tapered regions have that relationship which is necessary to substantially couple the maximum possible amount of the energy from said source to the transmission optical fiber.

2. A mode field modifier in accordance with claim 1 wherein said small diameter end is located adjacent said source, said small diameter end constituting said adiabatic region, and wherein said cladding means comprises a first cladding layer of refractive index $n_2$ surrounding said modifier core and a second cladding layer of refractive index $n_3$ on the surface of the first cladding layer, wherein $n_2 > n_3$.

3. A mode field modifier in accordance with claim 1 wherein said large diameter end is located adjacent said source, said large diameter end constituting said adiabatic region.

4. A mode field modifier in accordance with claim 1 wherein said source is another mode field modifier.

5. A mode field modifier in accordance with claim 1 wherein said source is another mode field modifier that is separated from said mode field modifier by a gap.

6. A mode field modifier in accordance with claim 1 wherein said source is means for converting an electrical signal to an optical signal.

7. A mode field modifier for coupling light from a source positioned adjacent one of the ends thereof to a transmission optical fiber positioned adjacent the opposite end thereof, said mode field modifier comprising
 a modifier core having a refractive index $n_1$, and
 a first cladding layer of refractive index $n_2$ surrounding said modifier core,
 a second cladding layer of refractive index $n_3$ on the surface of the first cladding layer, wherein $n_1 > n_2 > n_3$, and
 a tapered region intermediate the ends of said mode field modifier, whereby said mode field modifier has a large diameter end and a small diameter end, said small diameter end being adapted to be situated adjacent said source, characterized in that said tapered region has a nonadiabatic taper.

8. A mode field modifier for use in a connector employing a second mode field modifier operatively connected to said mode field modifier, said mode field modifier comprising a modifier core having a refractive index $n_1$, a first cladding layer of refractive index $n_2$ surrounding said modifier core, and a second cladding layer of refractive index $n_3$ on the surface of the first cladding layer, wherein $n_1 > n_2 > n_3$, and a tapered region intermediate the ends of said modifier, characterized in that said tapered region has a nonadiabatic taper.

9. A mode field modifier in accordance with claim 8 wherein said tapered region has a large diameter end and a small diameter end, the diameters of at least said core and said first cladding layer at said large diameter end being greater than the corresponding diameters at said small diameter end, whereby the mode field of an optical signal propagating in one end of the modifier is modified as said signal propagates through said tapered region, the diameters of said core and first cladding layer at said small diameter end being sufficiently small that the field of an input optical signal propagating in said large diameter end of said modifier toward the small diameter end thereof spreads and is effectively guided by the waveguide consisting of said first and second claddings, the non-adiabatic characteristic of said tapered region being such that the propagation of said input optical signal from the large diameter end of said second modifier to the small diameter end thereof causes mode conversion resulting in a multimode signal having at least one more mode than was present in said input signal, the small diameter end of said modifier comprising an adiabatic region adjacent the small diameter end of said tapered region, the length of the adiabatic region of said modifier, the length and taper angle of said tapered region, and the refractive indices $n_1$, $n_2$ and $n_3$ being such that, when the small diameter end of said mode field modifier is disposed adjacent the small diameter of said second modifier in axial alignment therewith, so that said multimode signal propagates from said second mode field modifier to said mode field modifier, the relative phases of the modes propagating in said mode field modifier at the junction between said adiabatic and tapered regions have that relationship which is necessary to substantially couple the maximum possible amount of the energy from said multimode signal to the optical waveguide comprising said modifier core and said first cladding layer at said large diameter end of said mode field modifier.

10. An optical device for connecting a pair of optical fibers, said device comprising first and second mode field modifiers, each comprising a modifier core having a refractive index $n_1$, a first cladding layer of refractive index $n_2$ surrounding said modifier core, and a second cladding layer of refractive index $n_3$ on the surface of the first cladding layer, wherein $n_1 > n_2 > n_3$, means for positioning the small diameter end of said first modifier adjacent the small diameter end of said second modifier with the axes of said first and second modifiers in substantial alignment, and a tapered region intermediate the ends of each of said modifiers, characterized in that said tapered region has a nonadiabatic taper.

11. A device in accordance with claim 10 wherein the tapered region of each of said modifiers has a large diameter end and a small diameter end, the diameters of at least said core and said first cladding layer at said large diameter end being greater than the corresponding diameters at said small diameter end, whereby the mode field of an optical signal propagating in one end of the modifier is modified as said signal propagates through said tapered region, the diameters of said core and first cladding layer at said small diameter end being sufficiently small that the field of an input optical signal propagating in said large diameter end of one of said modifiers toward the small diameter end thereof spreads and is effectively guided by the waveguide consisting of said first and second claddings, the non-adiabatic characteristic of said tapered region being such that the propagation of said input optical signal from the large diameter end of said second modifier to the small diameter end thereof causes mode conversion resulting in a multimode signal having at least one more mode than was present in said input signal, the small diameter end of each of said modifiers comprising an adiabatic region adjacent the small diameter end of said tapered region, the combined lengths of the adiabatic regions of said modifiers, the length and taper angle of said tapered region, and the refractive indices $n_1$, $n_2$ and $n_3$ being such that, when said multimode signal propagates from said second mode field modifier to said first mode field modifier, the relative phases of the modes propagating in said second mode field modifier at the junction between said adiabatic and tapered regions have that relationship which is necessary to substantially couple the maximum possible amount of the energy from said multimode signal to the optical waveguide comprising said modifier core and said first cladding layer at said large diameter end of said second mode field modifier.

* * * * *